UNITED STATES PATENT OFFICE.

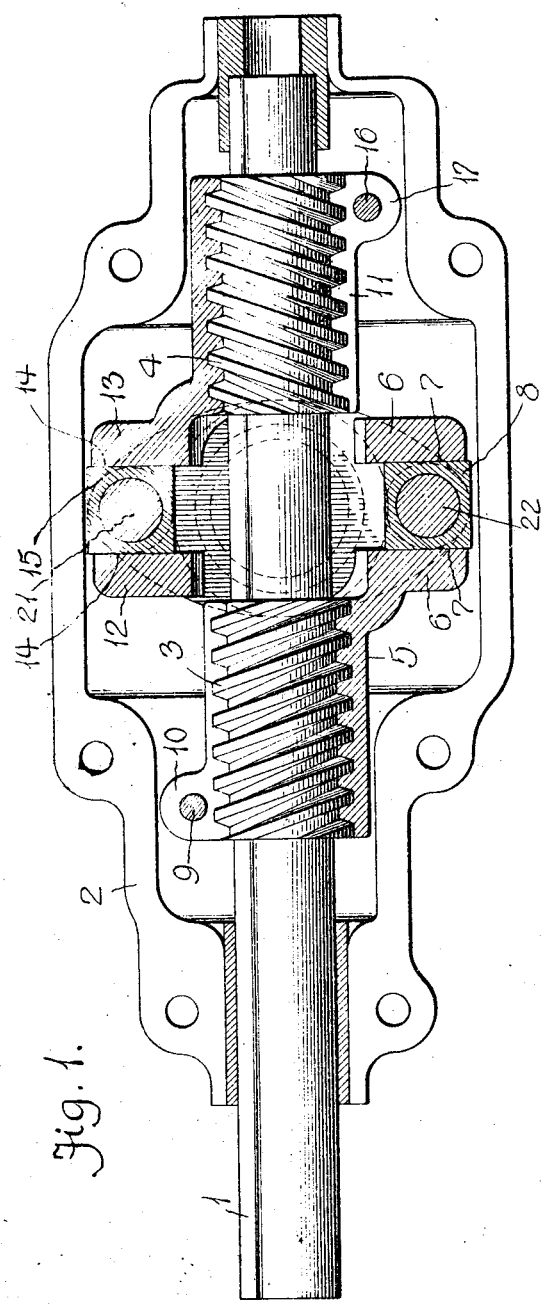
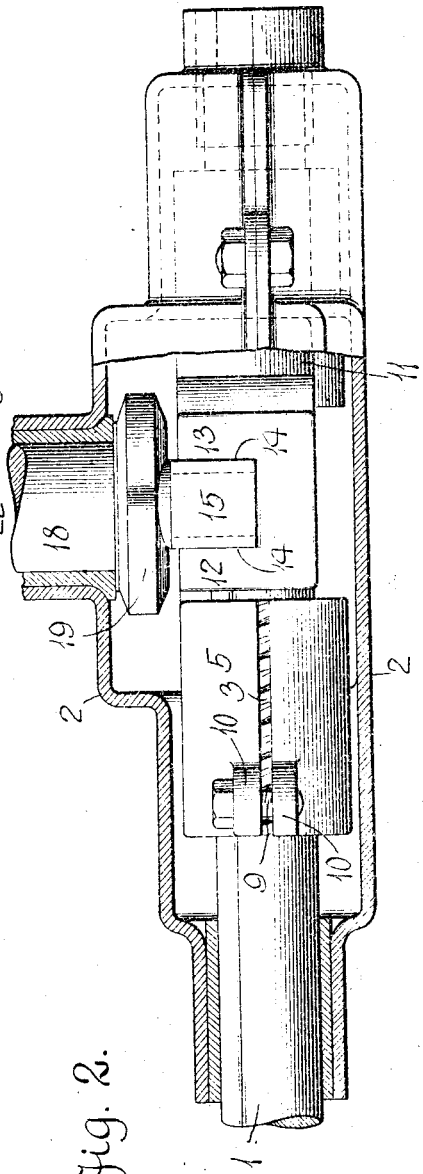

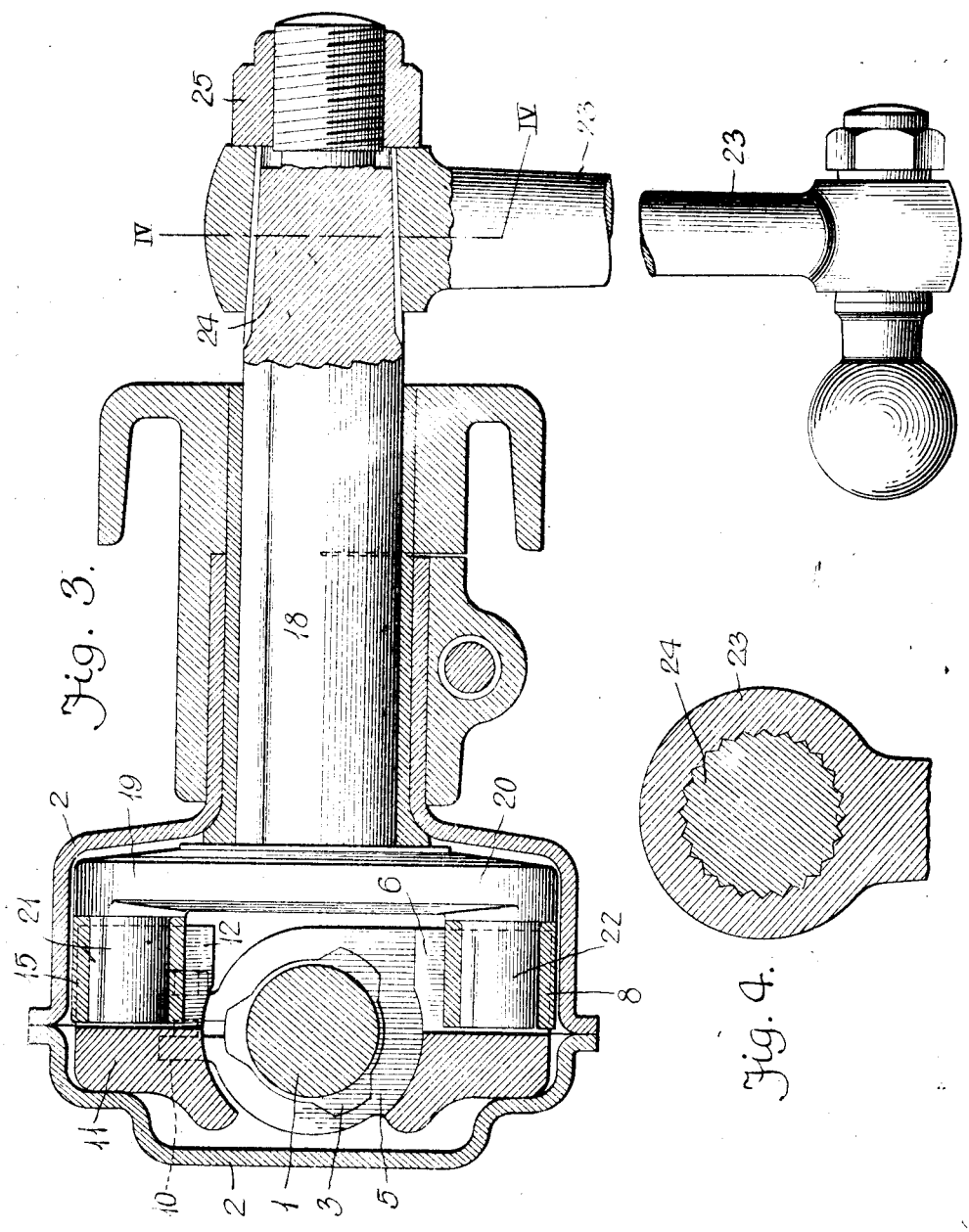

JOSEPH P. LAVIGNE, OF DETROIT, MICHIGAN, ASSIGNOR TO UNITED STATES NOVELTY MFG. CO., OF DETROIT, MICHIGAN, A CORPORATION OF MICHIGAN.

STEERING-GEAR.

1,185,806.

Specification of Letters Patent.     Patented June 6, 1916.

Application filed June 1, 1915. Serial No. 31,403.

*To all whom it may concern:*

Be it known that I, JOSEPH P. LAVIGNE, a citizen of the United States of America, residing at Detroit, in the county of Wayne and State of Michigan, have invented certain new and useful Improvements in Steering-Gear, of which the following is a specification, reference being had therein to the accompanying drawings.

In the operation of steering mechanisms for automobiles it is desirable not only to have quick positive acting means for transmitting the desired movement to the steering arm or knuckle, but it is also advisable to obtain this result with a minimum of end thrust upon the parts and with as few operating connections as possible in order to avoid liability to derangement.

This invention relates to a steering mechanism for automobiles and the like and to an arrangement thereof whereby the thrust against the steering post is balanced thereby avoiding the necessity of end thrust bearings, while the parts are so disposed and arranged as to form a positive lock against the movement of the steering wheel shaft from the backward thrust of the guide bearing wheels of the vehicle.

The invention consists in the matters hereinafter set forth and more particularly pointed out in the appended claims.

In the drawings, Figure 1 is a plan view, partially broken away and in section, of a mechanism that embodies features of the invention; Fig. 2 is a view in elevation, partially broken away and in section, of the mechanism; Fig. 3 is a view of the mechanism, partially in end elevation and partially in transverse section, showing also a steering arm connection; and Fig. 4 is a view in section on line IV—IV of Fig. 3.

As herein shown in preferred form, a steering wheel shaft 1 that is suitably journaled in a casing 2 designed to combine strength with lightness has a pair of oppositely threaded enlarged portions 3 and 4. A bushing 5 that is screwthreaded to reciprocate on the section 3 has a pair of oppositely disposed lugs 6 whose proximate faces 7 form guides in which a block 8 is reciprocable transversely to the shaft 1. The bushing 5 is split and is provided with a take up screw 9 passing through lugs 10 on either side of the kerf of the bushing whereby the latter may be made to operate on the screwthreaded section 3 without appreciable back lash. A companion bushing 11 oppositely disposed to the bushing 5 is in screwthreaded engagement with the section 4 and has a pair of lugs 12 and 13 whose proximate faces 14 form parallel guides for a thrust block 15 that is in alinement to the block 8. A take up bolt 16 engaging lugs 17 on either side of a kerf in the bushing, performs a similar function to the bolt 9 of the bushing 5 in affording means for preventing back lash.

A suitably mounted spindle 18 journaled in the casing 2 transversely to the shaft 1, has oppositely extending arms 19 and 20 with pins 21 and 22 extending therefrom and turning in bearing openings in the blocks 8 and 15 respectively. A steering arm 23 on the spindle 18 affords means for transmitting power from the spindle to turn the guide bearing wheels of a vehicle to any desired angle. Preferably the arm is adjustably secured to the spindle by means of a tapered socket that is forced on to a tapered longitudinally fluted portion 24 of the spindle 18 by a holding nut 25. This permits minute angular adjustment of the arm 23 on the spindle 18 and secures non-rotatable engagement of the parts.

In operation rotation of the shaft forces the oppositely disposed bushings from or toward each other thereby turning the spindle through the connecting slide blocks and studs in the desired direction. Because of the floating of the bushings on the shaft there is no necessity of a thrust bearing for the latter or for the other parts of the mechanism as the bushings themselves act in opposite direction and thereby maintain the shaft in desired position longitudinally. When once assembled the mechanism operates without more than ordinary attention and is readily accessible for inspection and replacement of parts.

Obviously, changes in the details of construction may be made without departing from the spirit of my invention and I do not care to limit myself to any particular form or arrangement of parts.

What I claim is:—

1. In a steering mechanism for automobiles, and the like, a casing, a wheel shaft journaled therein, a spindle journaled in the casing transversely to the main shaft, large oppositely screwthreaded portions on the main shaft symmetrically disposed in relation to the spindle axis, a bushing screwthreaded on each enlarged portion, and provided with guideways transverse to the main shaft, oppositely disposed arms on the spindle, thrust blocks each journaled on an arm to reciprocate in the guideways of a bushing, and a steering arm socketed on and secured to the end portion of the spindle.

2. In a steering mechanism for automobiles and the like, a main casing, a wheel shaft journaled in the casing, a spindle journaled in the casing transversely to the main shaft, enlarged oppositely screwthreaded portions on the main shaft symmetrically disposed in relation to the spindle axis, a bushing in screwthreaded engagement with each shaft portion, a pair of guide lugs on each bushing providing guides transversely disposed to the main shaft, oppositely disposed arms on the spindle, pins on the arm extremities, truss blocks journaled on the pins and reciprocable in the guides, the spindle having a projecting tapered and longitudinally fluted end portion, a steering arm having a tapered socket adapted to adjustably engage on the fluted portion of the spindle, and a holding nut for forcing the socketed portion of the arm on to the tapered portion of the spindle.

In testimony whereof I affix my signature in presence of two witnesses.

JOSEPH P. LAVIGNE.

Witnesses:
 ANNA M. DORR,
 C. R. STICKNEY.